Oct. 13, 1925.
E. A. CHRISTOPH
1,556,588
LOCKING MEANS FOR AUTOMOBILES AND THE LIKE
Filed Dec. 12, 1921   3 Sheets-Sheet 1
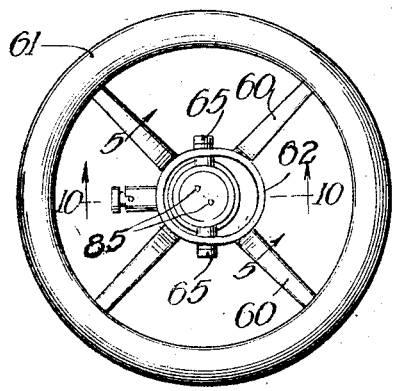
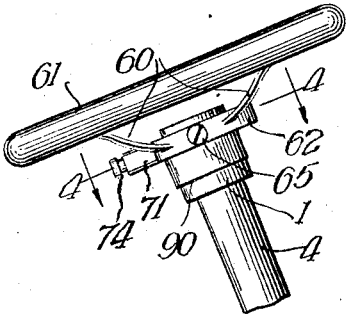
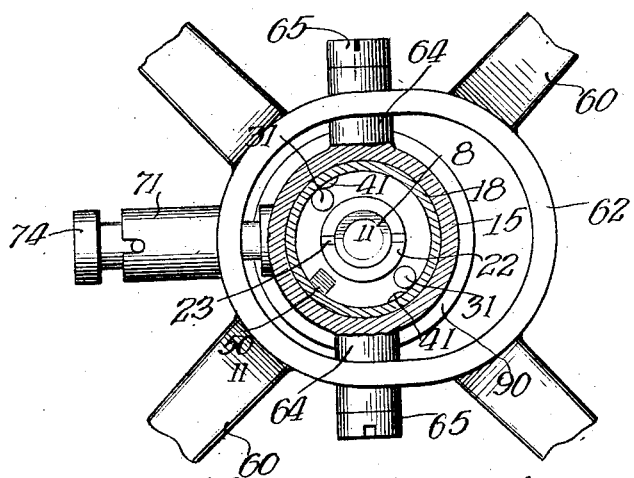
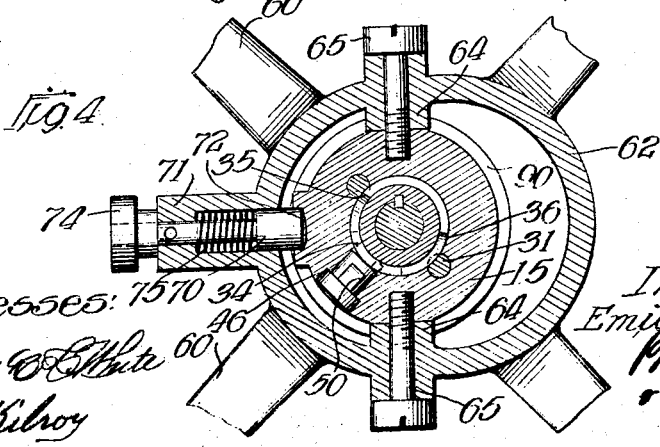
Inventor:
Emil A. Christoph.

Oct. 13, 1925.  
E. A. CHRISTOPH  
1,556,588  
LOCKING MEANS FOR AUTOMOBILES AND THE LIKE  
Filed Dec. 12, 1921  
3 Sheets-Sheet 2
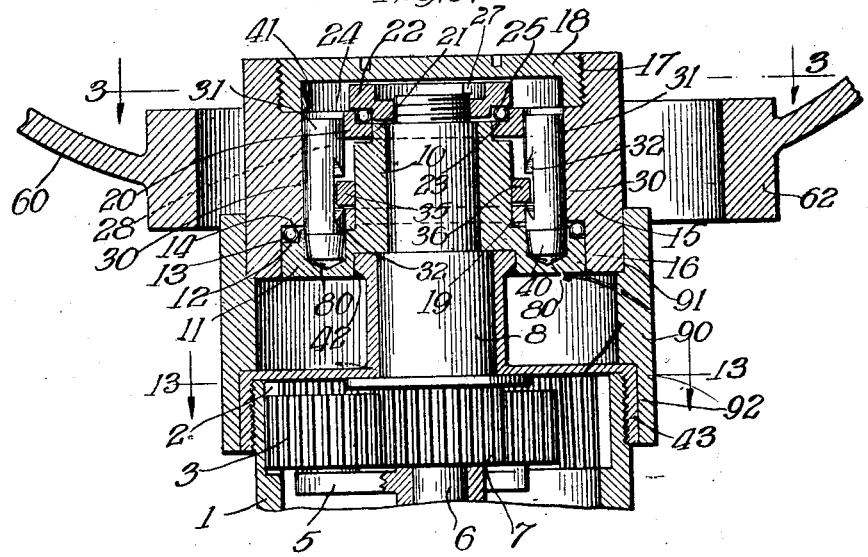
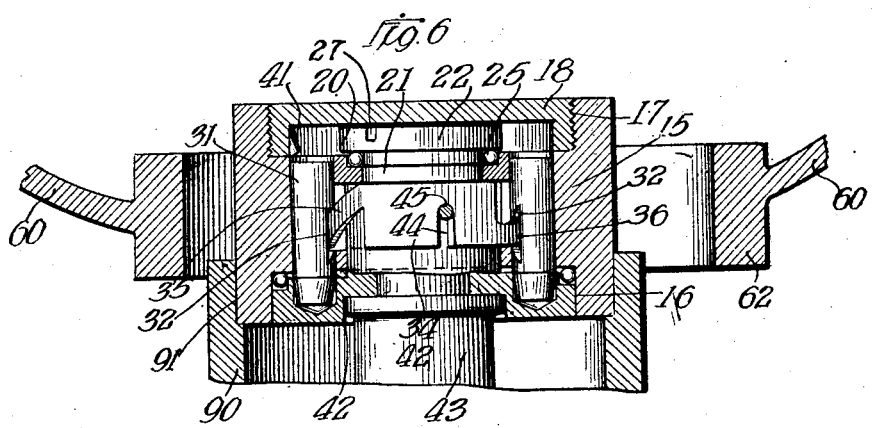
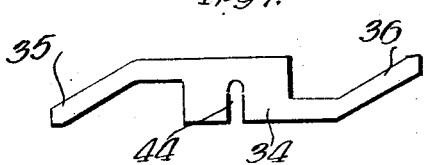
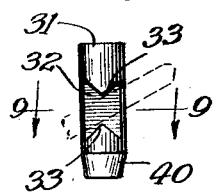
Inventor:  
Emil A. Christoph.

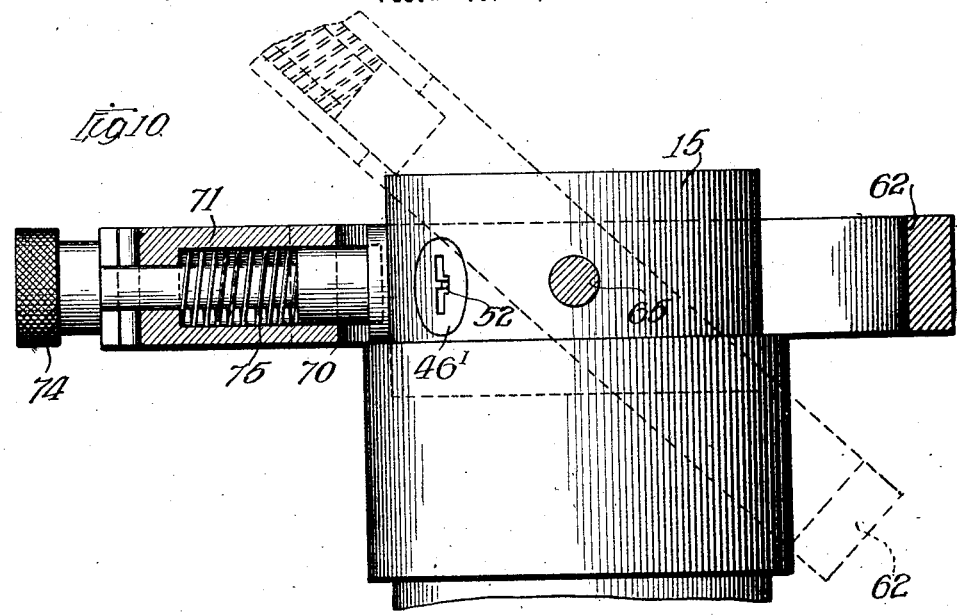
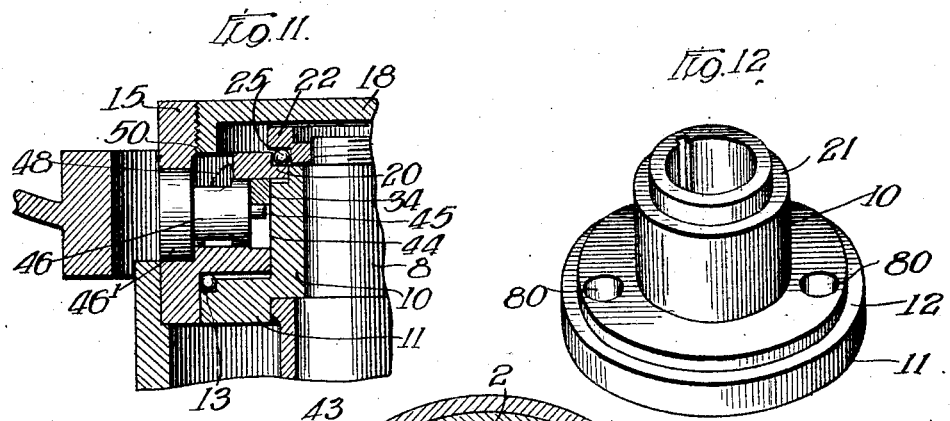
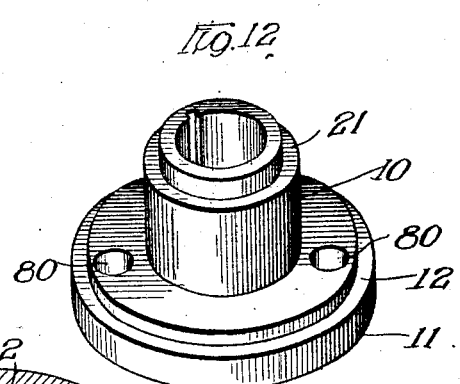
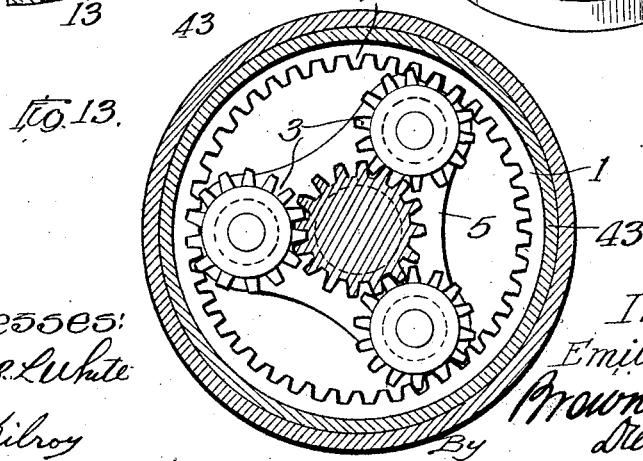

Patented Oct. 13, 1925.

1,556,588

UNITED STATES PATENT OFFICE.

EMIL A. CHRISTOPH, OF CHICAGO, ILLINOIS.

LOCKING MEANS FOR AUTOMOBILES AND THE LIKE.

Application filed December 12, 1921. Serial No. 521,636.

*To all whom it may concern:*

Be it known that I, EMIL A. CHRISTOPH, a citizen of the United States, residing at Chicago, in the county of Cook and State of Illinois, have invented a certain new and useful Improvement in Locking Means for Automobiles and the like, of which the following is a full, clear, concise, and exact description, reference being had to the accompanying drawings, forming a part of this specification.

My invention relates to theft preventing means for preventing the unauthorized use of motor vehicles and more particularly to an improved locking mechanism for rendering the steering gear inoperative so that it cannot be used to control the direction of movement of the vehicle.

In contradistinction to locking an automobile, for example, so that it cannot be moved, various arrangements for locking the car so that it can be moved but not put to unauthorized use have come into use as they permit the car to be rolled a short distance by hand or even towed away in case of fire or other necessity for clearing the space where the owner has left the vehicle. In many large cities, locking a vehicle so that it cannot be moved is prohibited by law in addition to being inadvisable. To prevent unauthorized use and at the same time permit such movement, arrangements have been provided for rendering the steering gear inoperative in two ways, first by locking the steering shaft or post against operation, and second by disconnecting the steering wheel so that it cannot be used to control the direction of movement of the car.

My invention belongs to the latter class, although certain aspects of the invention are not to be so limited but are capable of wider and more general use.

It is an object of my invention to increase the security, enhance the durability, strengthen and otherwise improve the structure of devices of this sort. To this end I have provided an improved mechanical construction, arrangement of parts, and assembly.

Another object of my invention is the provision of a locking mechanism adapted for ready association with various steering gear arrangements now in use, which locking mechanism will consist of few and simple parts, which may be readily assembled and installed, and when unlocked readily removed, but which, when locked, not only positively prevents operation of the steering gear, but is so arranged that it cannot be removed or rendered inoperative or access gained to any parts through which steering of the vehicle could be effected. To this end, I provide for rendering when the locking mechanism is locked, removal of the cover or other part through which access to the locking means is had, ineffective to prevent unauthorized access to the locking means when the lock is set. Another provision to this end is an improved arrangement for preventing unauthorized access, when the lock is set, to other parts through which steering could be effected.

A further object of my invention is to improve the functioning of such devices.

Further objects and advantages of my invention will appear from the following detailed description and the claims taken with an inspection of the accompanying drawings in connection with which I shall now describe a particular embodiment of the invention and manner of its use.

In the drawings:

Figure 1 is a top plan view of a steering wheel and post illustrating the application of an embodiment of my invention thereto;

Figure 2 is a side elevational view of the same;

Figure 3 is a reduced transverse section taken on the line 3—3 of Figure 5;

Figure 4 is a transverse sectional view taken substantially on the line 4—4 of Figure 2;

Figure 5 is an enlarged axial section taken substantially on the line 5—5 of Figure 1;

Figure 6 is a view similar to Figure 5 showing the tumbler actuating member and associated parts in elevation;

Figure 7 is a front elevational view of the tumbler actuating member as it would look flattened out in the same plane.

Figure 8 is a front elevational view of one of the tumblers or locking bolts employed;

Figure 9 is a horizontal cross sectional view taken on the line 9—9 of Figure 8;

Figure 10 is an enlarged sectional view through the hub of the steering wheel substantially on the line 10—10 of Figure 1;

Figure 11 is a fragmentary sectional view taken on the line 11—11 of Figure 3;

Figure 12 is an isometric view of the sleeve member which is mounted upon the steering post or shaft; and Figure 13 is a transverse sectional view taken on the line 13—13 of Figure 5.

With reference now to the drawings, the particular steering gear in connection with which I have selected to illustrate my invention comprises a gear case or compartment 1 provided with internal teeth 2 with which the steering gear or planet pinions 3 mesh. The internally toothed casing 1 is secured to the steering column 4. The planet pinions 3 are carried by a spider-like plate 5 secured to the upper end of the steering post 6. The planet pinions 3 mesh with a centrally arranged drive pinion 7 secured upon the lower end of a short shaft 8 so that upon rotation of the shaft 8 the pinions 3 are turned and the plate 5 and post or shaft 6 carrying the same is rotated to steer the vehicle as desired. The particular arrangement so far described is generally of the type now used on an automobile of well known make. The details of the steering gear, per se, are immaterial in so far as the essence of my invention is concerned. For example, the locking mechanism of my invention is not limited to use with a steering gear employing the planet pinion and internal gear arrangement described but is adapted for association with the various steering gears now in use. Such structural changes as are necessary in adapting the device to the different steering gears are contemplated within the scope of this invention.

The locking mechanism to which my invention is especially directed comprises a sleeve member 10 keyed upon that portion of the shaft 8 projecting upwardly from the cover 9 which closes off the upper end of the casing 1. The lower end of the sleeve 10 terminates in a radial flange 11, the outer upper edge of which flange 11 is reduced, as shown at 12, to receive suitable bearing members 13 arranged between it and an annular surface 14 which terminates a counter bore 16 in the lower end of the collar 15. The radial flange 11 of the sleeve 10 fits into the counter bore 16 upon arrangement of the collar 15 upon the sleeve 10. The upper end of the collar 15 is counterbored and internally threaded as shown at 17 for the reception of a suitable cover plate 18. An internal annular channel or groove 28 between the counterbored portions 16 and 17 of the collar 15 terminates at its lower end in a radially extending flange 19 and at its upper end in a radially extending annular flange 20. The sleeve 10 extends up through an opening in the flanged portion 19 and terminates at its upper end in a reduced portion 21 which extends into an opening or bore formed in the flange 20 to receive the same.

An end nut 22 threaded upon the upper reduced end of the shaft 8 is provided with a head between which and a recess 23 in the upper surface 24 in which the lower end of the internally threaded counter bore 17 terminates, suitable bearing members 25 are arranged. The bearings 13 and 25 take up any radial or end thrusts along the shaft 8 and provide free movement of the collar 15 about the sleeve 10 so that when the collar is disconnected from the sleeve as will be hereinafter more fully pointed out, it will be impossible to rotate the sleeve 10 through the collar as by exerting pressure to cause frictional engagement therebetween. The end nut 22 is provided with a slot 27 adapted to receive a suitable tool for screwing the nut up into the desired position and for removing the same. The proper adjustment of the bearings 13 and 25 is secured through the end nut 22 which nut also maintains the proper assembly of the various parts.

The collar 15 is provided with openings 30 which extend axially from the face 24 through the internal radially extending portion to the face 14 at diametrically opposite points. A locking tumbler or bolt 31 is arranged for axial or longitudinal movement in each of the diametrically opposite openings 30. The opposite faces of the tumbler pins 31 are scarfed or cut out as shown at 32 to provide oppositely pointed tumbler actuating member engaging edges 33 between which the projecting arms of the tumbler actuating member 34 operate. The tumbler actuating member 34 comprises a slotted central portion having a cam arm 35 declined downwardly from one end of the upper edge thereof and a cam arm 36 inclined upwardly from the opposite end of the lower edge thereof. This tumbler actuating member 34 may be made up in a flat piece, for example, and then bent sufficiently to permit its insertion either through the opening through the flanged portion 19 of the collar or through the opening through the flanged portion 20, whereupon it is spread into annular formation within the internal annular channel 28 so as to partially encircle the sleeve 10 upon arrangement of the same in the collar 15. The tumblers or pins 31 having been previously inserted into the openings 30, the cam arms 35 and 36 extend through the scarfed or cut out portions 32 in the opposing faces of the tumblers.

The upper ends of the tumblers 31 are preferably finished off substantially square, as shown, while the lower ends are preferably tapered slightly as at 40 to permit of their ready projection into recesses or openings 80 which extend into the flange 11 of the sleeve 10 from the upper surface thereof at diametrically opposite points. The internal periphery of the cover or cap plate 18 is indented at diametrically opposite points to provide inwardly extending lug portions 41, the purpose of which will be hereinafter made apparent. The under surface of the sleeve 10 is countersunk as shown at 42 to receive the upper end of the usual upwardly extending hub portion of the gear case cover 43.

The central portion of the tumbler actuating member 34 is provided with a slot 44 for the reception of an eccentric pin 45 projecting inwardly from the inner end of the plug or barrel 46 of a suitable lock revolvably mounted in the collar member 15 as shown in Figure 11. The barrel 46 is provided with the usual headed end 46'. The tumblers 48 of the lock 46 are adapted for cooperation with an upwardly extending opening 50 to lock the plug member or barrel 46 against rotation. The insertion and operation of the proper key in the keyway opening 52 serves to retract the tumblers 48 inwardly from the opening 50 so as to permit rotation of the barrel 46. Upon such rotation the tumbler actuating member 34 is moved through the channel 28 either to the right or to the left (Figure 5) through the eccentric pin 45, depending upon the direction of rotation of the barrel 46.

The steering wheel shown comprises a spider which includes a plurality of arms or spokes 60 to the outer ends of which is secured a rim 61. The arms 60 converge inwardly and are united at their inner ends through a hub 62 into which the collar 15 extends. The hub 62 is provided with diametrically opposite bosses 64, which bosses extend radially inwardly into cooperation with the periphery of the collar member or lock casing 15. Trunnion bolts 65 arranged through the hub 62 and radial bosses 64 and threaded at their inner ends into the collar member 15 serve to pivotally mount the steering wheel upon the collar or lock casing 15. A spring pressed plunger 70 arranged in a hollow boss 71 projecting from the hub 62 normally engages in a recess 72 in the collar member 15 to hold the wheel against pivotal movement. When it is desired to insert a key into the keyway opening 52 to disconnect the steering wheel from the steering post or to connect the same therewith, the finger piece 74 is grasped, the plunger 70 withdrawn against the tension of the spring 75 and the steering wheel 61 swung about the trunnion bolts 65 into substantially the position shown in dotted lines in Fig. 10. In addition to providing for insertion of the key, the pivotal mounting of the steering wheel yields sufficiently to take up the road jars and provides whereby the driver or other person in the driver's compartment may get out of the car with little difficulty.

While I have shown the hub 62 of the steering wheel as being of non-circular formation, such formation is immaterial and may be varied in actual practice. The particular showing simply provides such movement of the wheel as is necessary to clear the key-way opening 52. The hub 62 may be circular or it may be rigidly mounted, without departing from my invention. Furthermore, I contemplate embodying the principle of my invention in steering gear arrangements now in use without changing the structure of the steering wheels or other parts employed. When the pivotal mounting of the wheel is employed, the lock barrel may be arranged through one of the trunnions if so desired.

It will now be apparent that with the parts in the position shown in Figure 5, the steering wheel 61 is connected to the shaft 8 and consequently with the steering post of the vehicle through the collar 15, tumbler pins or bolts 31 and flanged sleeve 10, so that the vehicle may be steered as desired through the wheel 61. To prevent unauthorized use of the car as upon leaving the same stand, the plunger 70 is withdrawn, the wheel 61 swung about the bolts 65 into the position shown in dotted lines in Figure 10 and the proper key inserted to retract the tumblers 48 from the opening 50. The lock 46 with its eccentric pin 45 is then rotated to move the tumbler actuating member 34 to the left (Fig. 5) through the channel 28. The cooperation of the cam arms 35 and 36 with the downwardly pointed engaging edges 33 of the tumblers 31 thereby moves the tumblers upwardly from the recesses or openings 80 and into the cap or cover member 18. The wheel 61 is thereby disconnected from the steering shaft or post so as to rotate free thereof. As already pointed out the bearings 18 and 25 which are adjusted by means of the end nut 22, which nut also maintains the proper assembly of the parts, prevent rotation of the steering shaft through frictional engagement between the parts.

When the tumblers are thus projected into the cover member 18, their cooperation with the indented lug-like portions 41 prevents removal of the cover member, which member is provided with openings 85 for cooperation with a wrench or other suitable tool. The steering gear is thus disconnected and the lock mechanism locked against access. By again inserting the key the tumblers may again be moved down from within the cover 18 and into the recesses 80. The wheel is thereby connected to the steering gear and removal of the cover 18 is permitted for convenient access to the lock mechanism.

The arrangement of the tumbler actuating member within the tumblers and the mechanical construction, arrangement of the parts and heavy thief resisting structure permitted in a compact space makes for a thief proof device. There are no spring actuated locking devices that may be sprung with very little tampering, such as found in the prior art. The parts are few and exceedingly simple and sturdy and although the exposed parts are preferably case hardened, the structure and assembly is comparatively inexpensive.

To positively prevent access to the shaft 6 or pinions in the casing 1 when the wheel shown is disconnected, I provide a sleeve 90 which may be formed of any of a number of suitable metals or alloys, such as hardened steel, case hardened steel, manganese steel, or the like. The upper end of the sleeve 90 is bored out as shown at 91 to receive the lower end of the collar or casing 15 which is pressed therein, or the sleeve shrunk or otherwise secured thereupon against removal. The lower end of the sleeve 90 is bored out as shown at 92 to fit down over or embrace the gear case cover 43 and thereby prevent access to the steering gears therein except by removal of the collar 15 and sleeve 90 carried thereby, which is prevented by the end nut 22. When the wheel is disconnected, access to this nut is prevented as has already been pointed out. The sleeve 90 at the same time encloses the lower end of the collar 15 and sleeve 10 as well as the upwardly projecting hub-like portion of the case 43 against tampering. The sleeve 90 may be omitted where there is no gear case cover removal of which must be prevented when the lock is set.

I claim:

1. In combination, a steering gear, including a spindle member and wheel member adapted for operative connection, a collar adapted for connection with one of said members, a sleeve adapted for connection with the other of said members, a pair of tumbler members mounted in one of said members and adapted for cooperation with the other to operatively connect the same, said tumbler members having opposed edges for cooperation with an actuating member, and a tumbler actuating member having cam arms movable between said edges.

2. In combination, a steering wheel, a member adapted for connection therewith, a steering shaft or spindle, a second member mounted upon said shaft or spindle and adapted for rotation relative said first member, tumbler means mounted in said first member for movement along the shaft to operatively connect said members, a raceway in said member and a tumbler actuating cam mounted in said race-way for cooperation with said tumbler means.

3. In the combination defined in claim 1, the tumbler members constituting diametrically opposite pins movable in the direction of the axis of the shaft member and the tumbler actuating member encircling the shaft member between said shaft member and said pins.

4. In combination, a steering gear including a shaft member and wheel adapted for operative connection, a collar adapted for connection with one of said members, a sleeve adapted for connection with the other of said members, tumbler means mounted in one of said members and confined between the sleeve and collar, said tumbler means being adapted for cooperation with the other of said members to operatively connect the same, and a tumbler actuating member confined between the sleeve and collar for actuating said tumbler means.

5. In combination, a steering gear including a shaft member and wheel member adapted for operative connection, a collar for connection with one of said members, a sleeve for connection with the other of said members, said sleeve having a flange closing off one end of said collar, a cover for the opposite end of said sleeve and tumbler means mounted in the collar and movable in the direction of the axis of the shaft member into engagement with said flange to connect the wheel and shaft member and out of engagement with said flange and into engagement with said cover to disconnect the wheel and shaft member and prevent removal of the cover.

6. In the combination defined in claim 5, the tumbler members constituting diametrically opposite pins and the tumbler actuating member encircling the shaft member between the shaft member and said pins.

7. In combination, a tubular support, a rotatable steering post in said support, a steering wheel for rotating said post, a cap mounted upon and closing the upper end of said tubular support, connections between said steering wheel and post held in place by said cap, enclosing means for said connections, and means secured against removal by said enclosing means for preventing removal of said cap.

8. In combination, a steering post having a shaft member, a steering wheel, connecting gearing therebetween, a casing for said gearing, a cover for said casing, said cover having an upwardly extending hub about the shaft member, a sleeve member mounted upon the shaft member and supported by said hub, a casing member about said sleeve, said sleeve having means closing the lower end of said casing member, means for closing the upper end of said member and means within said member and between said closing means for connecting and disconnecting the wheel and shaft member.

9. In combination, a steering post having a shaft member, a steering wheel, connecting gearing therebetween, a casing for said gearing, a cover for said casing, said cover having an upwardly extending hub about the shaft member, a sleeve member mounted upon the shaft member and supported by said hub, a casing member about said sleeve, said sleeve having means closing the lower end of said casing member, means within said casing member for connecting and disconnecting the wheel and shaft member, and a sleeve member pressed on said casing member and extending down over said cover to prevent removal thereof and access to said closing means.

In witness whereof, I hereunto subscribe my name this 6 day of December, 1921.

EMIL A. CHRISTOPH.